Mar. 27, 1923. 1,449,515
S. KUCHARSKI
CINEMATOGRAPH APPARATUS WITH ENDLESS FILM BAND
Filed Aug. 31, 1921
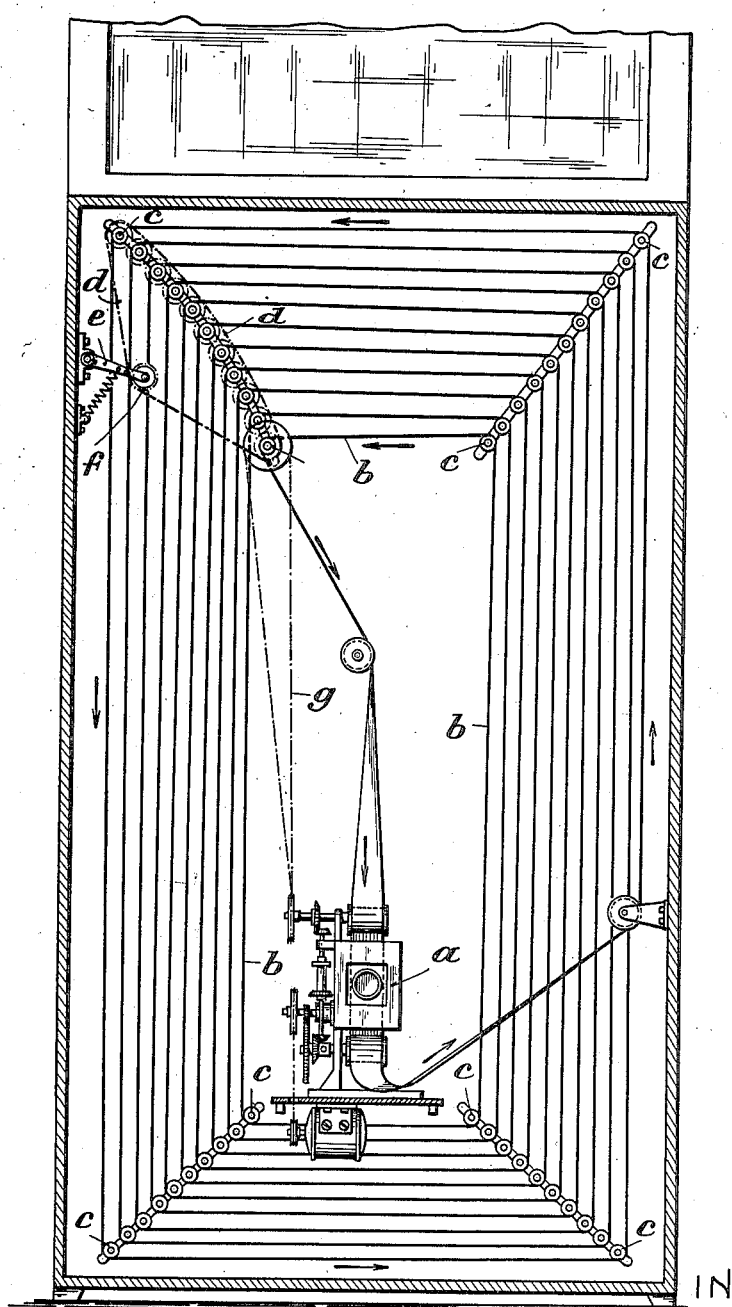
INVENTOR
Stanislaus Kucharski
BY his ATTORNEYS
Pennie, Davis, Marvin and Edmonds Patented Mar. 27, 1923.

1,449,515

UNITED STATES PATENT OFFICE.

STANISLAUS KUCHARSKI, OF CHARLOTTENBURG, NEAR BERLIN, GERMANY.

CINEMATOGRAPH APPARATUS WITH ENDLESS FILM BAND.

Application filed August 31, 1921. Serial No. 497,304.

*To all whom it may concern:*

Be it known that I, STANISLAUS KUCHARSKI, engineer, a citizen of Germany, residing at Dernburgstrasse 45, Charlottenburg, near Berlin, Germany, have invented certain new and useful Improvements in Cinematograph Apparatus with Endless Film Bands (for which application has been filed in Germany January 27, 1920), of which the following is a specification.

The present invention relates to an improvement on the arrangement, according to which in a cinematograph apparatus with endless film, the rollers over which the film is guided, are positively moved by the gear of the cinematograph. While in the prior arrangements of this kind the customary guiding of the endless film over individual rollers disposed in diagonal rows is dispensed with, the present invention has for object to render possible the positive drive of film guiding rollers also in such case, where the rollers are disposed in the customary manner in diagonal rows, which has proved most suitable for local reasons and the run of the film. For this purpose the present invention consists in that the rollers of one diagonal row are in operative connection by means of a chain or rope, driven by the gear of the cinematograph.

One mode of construction according to the invention is illustrated in the drawing.

Here the film $b$ traveling through the cinematographic apparatus $a$ is guided in the usual manner over a number of rollers $c$ disposed in diagonal rows. The rollers of the one diagonal row (left top corner of the drawing) are coupled by means of a chain $d$ or any other suitable pulling member in such a way, that the chain is led over chain-wheels, which latter are provided on the axles of said rollers. The chain is kept under the required tension by means of lever $e$ under spring action and provided with chain rollers $f$. The lowermost of the axles of the guiding rollers in the diagonal row to be set in operation receives its motion through the gear of the cinematograph $a$ by means of a chain $g$.

Claims:

1. In cinematograph apparatus, the combination with the film, and the guiding rollers for the film arranged in rows diagonally disposed with respect to the projection apparatus, of means in connection with one of the rows of rollers for coupling said rollers together and driven by the operating means for the apparatus.

2. In cinematograph apparatus, the combination with the film, and the guiding rollers for the film arranged in rows diagonally disposed with respect to the projection apparatus, of means in connection with one of the rows of rollers for coupling said rollers together and driven by the operating means of the apparatus, said means comprising sprocket wheels on the respective rollers of the row, a sprocket chain engaging all of the wheels and means for adjusting the chain.

In testimony whereof I have affixed my signature in presence of two witnesses.

STANISLAUS KUCHARSKI.

Witnesses:
ABRAM HAUSSMANN,
GUSTAV PIETICH.